United States Patent
Lewis et al.

(10) Patent No.: US 11,997,089 B2
(45) Date of Patent: *May 28, 2024

(54) METHODS, SYSTEMS, AND MEDIA FOR AUTHENTICATION OF USER DEVICES TO A DISPLAY DEVICE

(71) Applicant: Google LLC, Mountain View, CA (US)

(72) Inventors: Justin Lewis, South San Fracisco, CA (US); Scott Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,332

(22) Filed: Jan. 24, 2022

(65) Prior Publication Data
US 2022/0150248 A1    May 12, 2022

Related U.S. Application Data

(63) Continuation of application No. 16/812,797, filed on Mar. 9, 2020, now Pat. No. 11,233,791, which is a
(Continued)

(51) Int. Cl.
*H04L 9/40* (2022.01)
*G06F 21/44* (2013.01)
*H04N 21/258* (2011.01)

(52) U.S. Cl.
CPC .......... *H04L 63/0876* (2013.01); *G06F 21/44* (2013.01); *H04L 63/08* (2013.01); *H04L 63/20* (2013.01); *H04N 21/25816* (2013.01)

(58) Field of Classification Search
CPC ..... H04L 63/0876; H04L 63/08; H04L 63/20; G06F 21/44; G06F 3/1423; H04N 21/25816
See application file for complete search history.

(56) References Cited

U.S. PATENT DOCUMENTS 8,749,452 B2   6/2014  Hosein et al.
9,210,144 B2  12/2015  Pearson et al.
(Continued)

FOREIGN PATENT DOCUMENTS

CN   102215216   10/2011
CN   105072608   11/2015
(Continued)

OTHER PUBLICATIONS

Detti, Andrea, Bruno Ricci, and Nicola Blefari-Melazzi. "Peer-to-peer live adaptive video streaming for information centric cellular networks." 2013 IEEE 24th Annual International Symposium on Personal, Indoor, and Mobile Radio Communications (PIMRC). IEEE, 2013. (Year: 2013).*

(Continued)

*Primary Examiner* — Vance M Little
*Assistant Examiner* — Sameera Wickramsuriya
(74) *Attorney, Agent, or Firm* — Kilpatrick Townsend & Stockton LLP

(57) ABSTRACT

Methods, systems, and media for authentication of user devices to a display device are provided. In some implementations, the method comprises: authenticating a first user device to a display device, where the first user device is provided with media playback control on the display device in response to the authentication; identifying a second user device in proximity to the first user device; transmitting, from the first user device to the second user device, an invitation message to authenticate the second user device to the display device; and transmitting, from the first user device to the second user device, an authentication token that causes the second user device to request authentication to the display device from the server, where the second user device is provided with media playback control on the (Continued)

display device in response to authenticating with the display device.

21 Claims, 5 Drawing Sheets

Related U.S. Application Data continuation of application No. 15/268,105, filed on Sep. 16, 2016, now Pat. No. 10,587,616.

(56) References Cited

U.S. PATENT DOCUMENTS

| | | | |
|---|---|---|---|
| 10,440,075 | B2 | 10/2019 | Garmark et al. |
| 2009/0217036 | A1 | 8/2009 | Irwin et al. |
| 2011/0191237 | A1* | 8/2011 | Faith ............. G06Q 20/40 705/1.1 |
| 2013/0073622 | A1 | 3/2013 | Nguyen et al. |
| 2013/0174223 | A1* | 7/2013 | Dykeman ........... G06F 21/10 726/4 |
| 2013/0318249 | A1 | 11/2013 | McDonough et al. |
| 2014/0156319 | A1 | 6/2014 | Deeb |
| 2014/0156854 | A1 | 6/2014 | Gaetano, Jr. |
| 2014/0173125 | A1 | 6/2014 | Selvanandan |
| 2014/0173695 | A1 | 6/2014 | Valdivia |
| 2014/0197232 | A1 | 7/2014 | Birkler et al. |
| 2014/0282877 | A1* | 9/2014 | Mahaffey ........... H04W 12/33 726/3 |
| 2014/0282990 | A1* | 9/2014 | Engelhart ........... H04L 67/02 726/9 |
| 2014/0362728 | A1* | 12/2014 | Krochmal ......... H04W 12/033 370/254 |
| 2015/0058936 | A1 | 2/2015 | Kang et al. |
| 2016/0105472 | A1* | 4/2016 | Chitroda ........... H04L 65/1083 709/204 |
| 2016/0191590 | A1* | 6/2016 | Werkelin Ahlin .... H04L 63/083 726/4 |
| 2016/0234213 | A1 | 8/2016 | Kim et al. |
| 2016/0337314 | A1* | 11/2016 | Yu ..................... H04L 43/50 |

FOREIGN PATENT DOCUMENTS

| | | |
|---|---|---|
| DE | 202012012944 | 5/2014 |
| EP | 2683127 | 1/2014 |
| EP | 3051747 | 8/2016 |
| EP | 3041245 | 10/2018 |
| WO | WO 2014014695 | 1/2014 |
| WO | WO 2015200535 | 12/2015 |

OTHER PUBLICATIONS

S. K. S. Gupta, T. Mukheriee, K. Venkatasubramanian and T. B. Taylor, "Proximity based access control in smart-emergency departments," Fourth Annual IEEE International Conference on Pervasive Computing and Communications Workshops (PERCOMW'06), Pisa, Italy, 2006, pp. 5 pp.-516, (Year: 2006).*
Al-Chalabi, A., "A Wearable and Ubiquitous NFC Wallet", In Proceedings of the Canadian Conference on Electrical and Computer Engineering, Halifax, Canada, May 3-6, 2015, pp. 152-157.
Examination Report dated Jul. 15, 2021 in IN Patent Application No. 201744029545.
Examination Report dated Dec. 14, 2020 in DE Patent Application No. 10 2017 121 212.4.
How-To Geek, "How to Give Guests Access to Your Google Chromecast", last accessed Jul. 21, 2016, pp. 1-4, available at: http://www.howtogeek.com/205024/how-to-give-guests-access-to-your-google-chromecast/.
International Search Report and Written Opinion dated Nov. 6, 2017 in International Patent Application No. PCT/US2017/050948.
Notice of Allowance dated Sep. 9, 2021 in U.S. Appl. No. 16/812,797.
Notice of Allowance dated Oct. 30, 2019 in U.S. Appl. No. 15/268,105.
Office Action dated Jan. 9, 2019 in U.S. Appl. No. 15/268,105.
Office Action dated Feb. 15, 2018 in GB Patent Application No. 1714807.3.
Office Action dated May 12, 2021 in U.S. Appl. No. 16/812,797.
Office Action dated Jun. 19, 2019 in U.S. Appl. No. 15/268,105.
Office Action dated Sep. 12, 2018 in U.S. Appl. No. 15/268,105.
Office Action dated Nov. 10, 2020 in U.S. Appl. No. 16/812,797.

* cited by examiner

METHODS, SYSTEMS, AND MEDIA FOR AUTHENTICATION OF USER DEVICES TO A DISPLAY DEVICE

CROSS-REFERENCE TO RELATED APPLICATIONS

This application is a continuation of U.S. patent application Ser. No. 16/812,797, filed Mar. 9, 2020, which is a continuation of U.S. patent application Ser. No. 15/268,105, filed Sep. 16, 2016, each of which is hereby incorporated by reference herein in its entirety.

TECHNICAL FIELD

The disclosed subject matter relates to methods, systems, and media for authentication of second screen user devices to a display device.

BACKGROUND

Many people enjoy using a second screen device, such as a mobile phone or tablet computer, to select media content items to be presented on a primary device, such as a television, audio speakers, or a projector. Additionally, people may want to have multiple second screen devices be allowed to communicate with the primary device, for example, the multiple devices within a household. However, it can be time-consuming to authenticate each of the multiple devices to the primary device. For example, each second screen device may be individually authenticated with the primary device, such as a display device, with user account information, password information, device information, display device code information (e.g., a code of a display device that may itself be difficult to locate), etc. and only once such information is inputted can a user of a second screen device communicate with the primary device.

Accordingly, it is desirable to provide new methods, systems, and media for authentication of user devices to a display device.

SUMMARY

Methods, systems, and media for authentication of user devices to a display device are provided.

In accordance with some implementations of the disclosed subject matter, a method for authentication of user devices is provided, the method comprising: authenticating a first user device to a display device, wherein an authentication token is associated with the authentication of the first user device to the display device, wherein the authentication token is stored on a server in association with an identifier of the first user device, and wherein the first user device is provided with media playback control on the display device in response to the authentication; identifying, using the first user device, a second user device in proximity to the first user device; transmitting, from the first user device to the second user device, an invitation message to authenticate the second user device to the display device; and in response to receiving a response to the invitation message from the second user device, transmitting, from the first user device to the second user device, the authentication token that causes the second user device to request authentication to the display device from the server, wherein the second user device is provided with media playback control on the display device in response to authenticating with the display device.

In some implementations, the method further comprises: generating, using the first user device, the authentication token; and transmitting the authentication token to the server.

In some implementations, the method further comprises receiving, from a contact list associated with a first user of the first user device, an indication of a second user of the second user device, wherein the second user device is identified based on the received indication.

In some implementations, identifying the second user device further comprises detecting the second user device based on a connection to a network.

In some implementations, identifying the second user device further comprises: detecting a movement of the first user device; transmitting, to the server, an indication of the movement and a first location associated with the first user device; and receiving, from the server, an identifier associated with the second user device, wherein the second user device detected the movement of the second user device at a second location and wherein the first location and the second location are within a predetermined distance.

In some implementations, the method further comprises: receiving, from a user of the first user device, an indication that the second user device is not to be authenticated to the display device; and transmitting, to the server, a request to remove authentication permission for the second user device to the display device.

In accordance with some implementations of the disclosed subject matter, a system for authentication of user devices is provided, the system comprising a hardware processor on a first user device that is configured to: authenticate the first user device to a display device, wherein an authentication token is associated with the authentication of the first user device to the display device, wherein the authentication token is stored on a server in association with an identifier of the first user device, and wherein the first user device is provided with media playback control on the display device in response to the authentication; identify, using the first user device, a second user device in proximity to the first user device; transmit, from the first user device to the second user device, an invitation message to authenticate the second user device to the display device; and in response to receiving a response to the invitation message from the second user device, transmit, from the first user device to the second user device, the authentication token that causes the second user device to request authentication to the display device from the server, wherein the second user device is provided with media playback control on the display device in response to authenticating with the display device.

In accordance with some implementations of the disclosed subject matter, a non-transitory computer-readable medium containing computer-executable instructions that, when executed by a processor, cause the processor to perform a method for authentication of user devices is provided, the method comprising: authenticating a first user device to a display device, wherein an authentication token is associated with the authentication of the first user device to the display device, wherein the authentication token is stored on a server in association with an identifier of the first user device, and wherein the first user device is provided with media playback control on the display device in response to the authentication; identifying, using the first user device, a second user device in proximity to the first user device; transmitting, from the first user device to the second user device, an invitation message to authenticate the second user device to the display device; and in response to receiving a response to the invitation message from the second user device, transmitting, from the first user device to the second user device, the authentication token that causes the second user device to request authentication to the display device from the server, wherein the second user device is provided with media playback control on the display device in response to authenticating with the display device.

In accordance with some implementations of the disclosed subject matter, a system for authentication of user devices is provided, the system comprising: means for authenticating a first user device to a display device, wherein an authentication token is associated with the authentication of the first user device to the display device, wherein the authentication token is stored on a server in association with an identifier of the first user device, and wherein the first user device is provided with media playback control on the display device in response to the authentication; means for identifying, using the first user device, a second user device in proximity to the first user device; means for transmitting, from the first user device to the second user device, an invitation message to authenticate the second user device to the display device; and means for transmitting, from the first user device to the second user device, the authentication token that causes the second user device to request authentication to the display device from the server in response to receiving a response to the invitation message from the second user device, wherein the second user device is provided with media playback control on the display device in response to authenticating with the display device.

In some implementations, the system further comprises: means for generating using the first user device, the authentication token; and means for transmitting the authentication token to the server.

In some implementations, the system further comprises: means for transmitting, to the server, a request for the authentication token; and means for receiving the authentication token from the server.

In some implementations, the system further comprises means for receiving, from a contact list associated with a first user of the first user device, an indication of a second user of the second user device, wherein the second user device is identified based on the received indication.

In some implementations, the system further comprises means for detecting the second user device based on a connection to a network.

In some implementations, the system further comprises: means for detecting a movement of the first user device; means for transmitting, to the server, an indication of the movement and a first location associated with the first user device; and means for receiving, from the server, an identifier associated with the second user device, wherein the second user device detected the movement of the second user device at a second location and wherein the first location and the second location are within a predetermined distance.

In some implementations, the system further comprises: means for receiving, from a user of the first user device, an indication that the second user device is not to be authenticated to the display device; and means for transmitting, to the server, a request to remove authentication permission for the second user device to the display device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
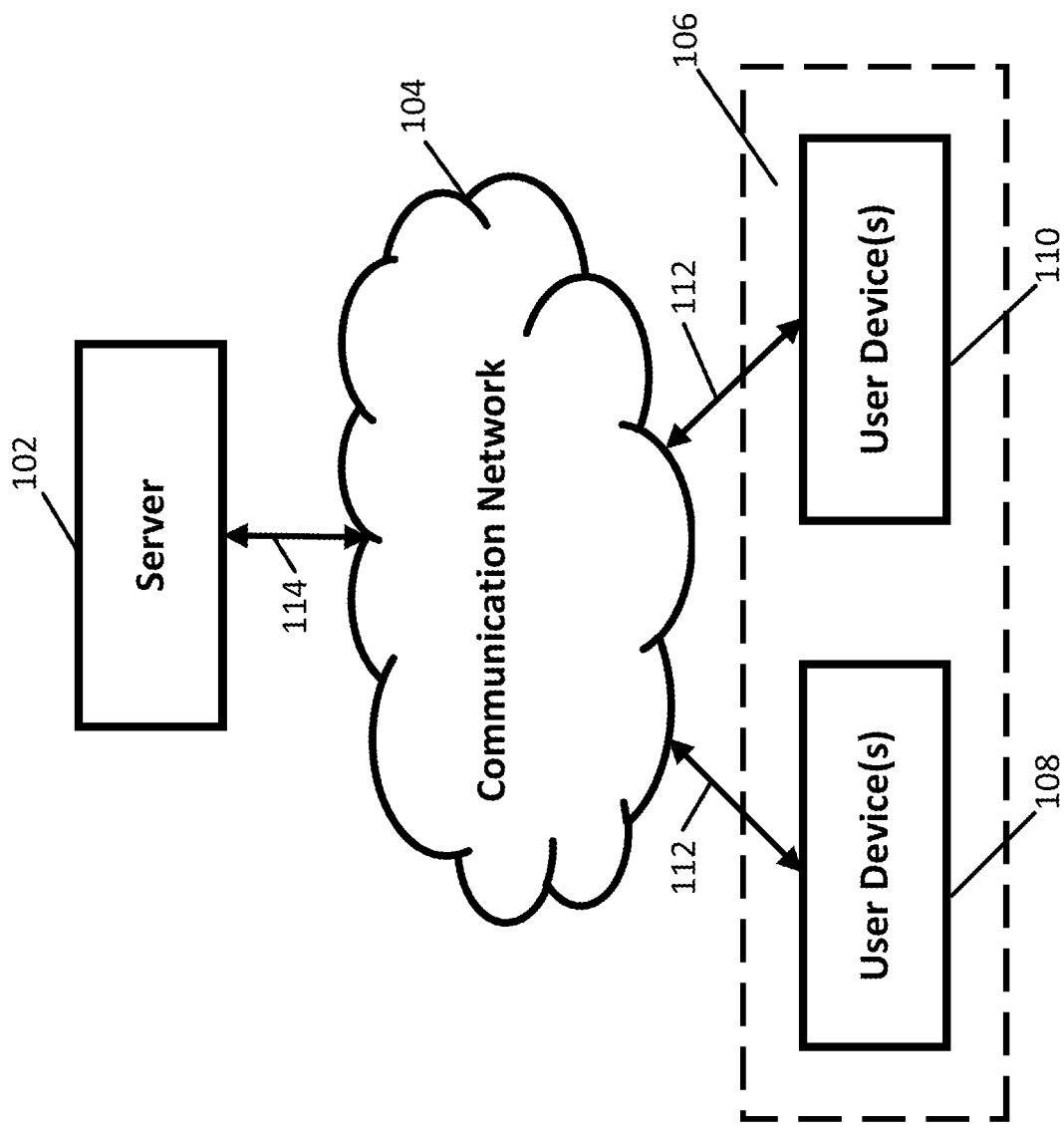
FIG. 1 shows a schematic diagram of an example of a system for authenticating user devices to pair with a display device in accordance with some implementations of the disclosed subject matter.

In accordance with various implementations, mechanisms (which can include methods, systems, and media) for authentication of user devices to a display device are provided.

In accordance with some implementations, the mechanisms presented herein can authenticate a second user device for communication with a display device using a token previously used to authenticate a first user device to the display device. In some implementations, the mechanisms can cause a server to store an access control list (ACL) that indicates all user devices authenticated to communicate with a particular display device in association with the token, which can indicate an identity of the display device. In some such implementations, the server can receive requests to present particular media content items on the display device and can determine whether the user device that transmitted the request is included in the ACL associated with the display device based on the token. The server can then cause the requested media content item to be presented on the display device if it is determined that the user device is included in the ACL. The mechanisms described herein can thereby allow a first user device to transfer an authentication token to a second user device to authenticate the second user device to the display device, and can allow the second user device to request particular content items to be presented on the display device through the server. Upon authenticating the second user device to the display device with the transferred authentication token, the second user device can then, for example, receive media playback control of the display device.

In some implementations, the first user device can be authenticated to communicate with the display device in any suitable manner, such as by receiving, from a user of the first user device, a password and/or code associated with the display device. In some implementations, the pairing between the first user device and the display device can be associated with a particular token (e.g., a randomly generated alphanumeric string generated by a server and/or the first user device), which can be stored on a server. In some implementations, the first user device can detect other user devices near the first user device, and can then transmit the token representing the display device that the first user device is already paired with to a detected nearby second user device. In some implementations, the second user device can then transmit a request to be authenticated to the display device to the server, and can include the token in the request. In response to receiving the request from the second user device that includes the token corresponding to the display device, the server can add an identifier corresponding to the second user device to the ACL corresponding to the display device, thereby allowing the second user device to be authenticated to the display device without requiring a password and/or code to be explicitly input by a user of the second user device.

Note that, in some implementations, the first user device can detect nearby user devices using any suitable technique or combination of techniques. For example, in some implementations, the first user device can detect other user devices connected to a particular network, can use audible and/or subaudible tones (e.g., ultrasonic, and/or any other suitable type of subaudible tones) to detect other user devices, can transmit a multicast message on a network (e.g., a WIFI network, a BLUETOOTH network, and/or any other suitable type of network that uses a wireless communication standard) and can detect user devices that response to the message, and/or detect nearby user devices in any suitable manner. Additionally, in some implementations, a second user device can be explicitly indicated by a user of the first user device based on a selection of an identifier associated with the second user device (e.g., via a list of contacts, a list of other devices detected on a particular network, and/or in any other suitable manner).

In some implementations, the first user device, the second user device, and the display device can be any suitable type(s) of devices. For example, in some implementations, the first user device and/or the second user device can be user devices with no screen and/or relatively small screens, such as tablet computers, laptop computers, wearable computers, a personal assistant device, and/or any other suitable type of device. As another example, in some implementations, the display device can be any suitable type of device suitable for presenting media content (e.g., video content, audio content, websites, pictures, live-streamed programs, radio programs, television programs, audiobooks, and/or any other suitable type of content). As a more particular example, in some implementations, the display device can include a television, a projector, audio speakers (and/or a personal assistant device that includes audio speakers), a tablet computer, a desktop computer, a laptop computer, and/or any other suitable type of display device.

Turning to FIG. 1, an example 100 of hardware for authenticating a user device to a display device that can be used in accordance with some implementations of the disclosed subject matter is shown. As illustrated, hardware 100 can include one or more servers, such as server 102, a communication network 104, and one or more user devices 106.

Server 102 can be any suitable server for facilitating authentication of a user device to a display device. For example, in some implementations, server 102 can store an indication of a first user device authenticated to communicate with a display device. In some implementations, server 102 can then grant permission to a second user device to communicate with the display device in response to receiving a token from the second user device that corresponds to the display device currently authenticated to communicate with the first user device. Additionally, in some implementations, server 102 can store an ACL indicating user devices that are authenticated to communicate with the display device. In some such implementations, server 102 can receive, from a user device included in the ACL, a request to present a media content item on the display device and can cause the media content item to be presented on the display device. For example, in some implementations, server 102 can cause the media content item to be streamed to the display device for playback on the display device.

Communication network 104 can be any suitable combination of one or more wired and/or wireless networks in some implementations. For example, communication network 104 can include any one or more of the Internet, a mobile data network, a satellite network, a local area network, a wide area network, a telephone network, a cable television network, a WIFI network, a WIMAX network, a BLUETOOTH network, and/or any other suitable communication network that uses a wireless communication standard.

User device(s) 106 can include any one or more user devices (e.g., user device 108 and/or user device 110) suitable for requesting media content, and/or performing any other suitable functions. For example, in some implementations, user device(s) 106 can include mobile devices, such as a mobile phone, a tablet computer, a laptop computer, a vehicle (e.g., a car, a boat, an airplane, or any other suitable vehicle) entertainment system, a portable media player, a wearable computer, or any other suitable mobile device. As another example, in some implementations, user device(s) 106 can include non-mobile devices such as a desktop computer, a set-top box, a television, a streaming media player, a game console, audio speakers, a projector, or any other suitable non-mobile device. User devices 106 can be connected by one or more communications links 112 to communication network 104 that can be linked via a communication link 114 to server 102.

Although only one server is shown in FIG. 1 to avoid over-complicating the figure, any suitable one or more servers can be used in some implementations. Also, any suitable number of user devices 106, and any suitable types of these devices, can be used in some implementations.

Figure 2:
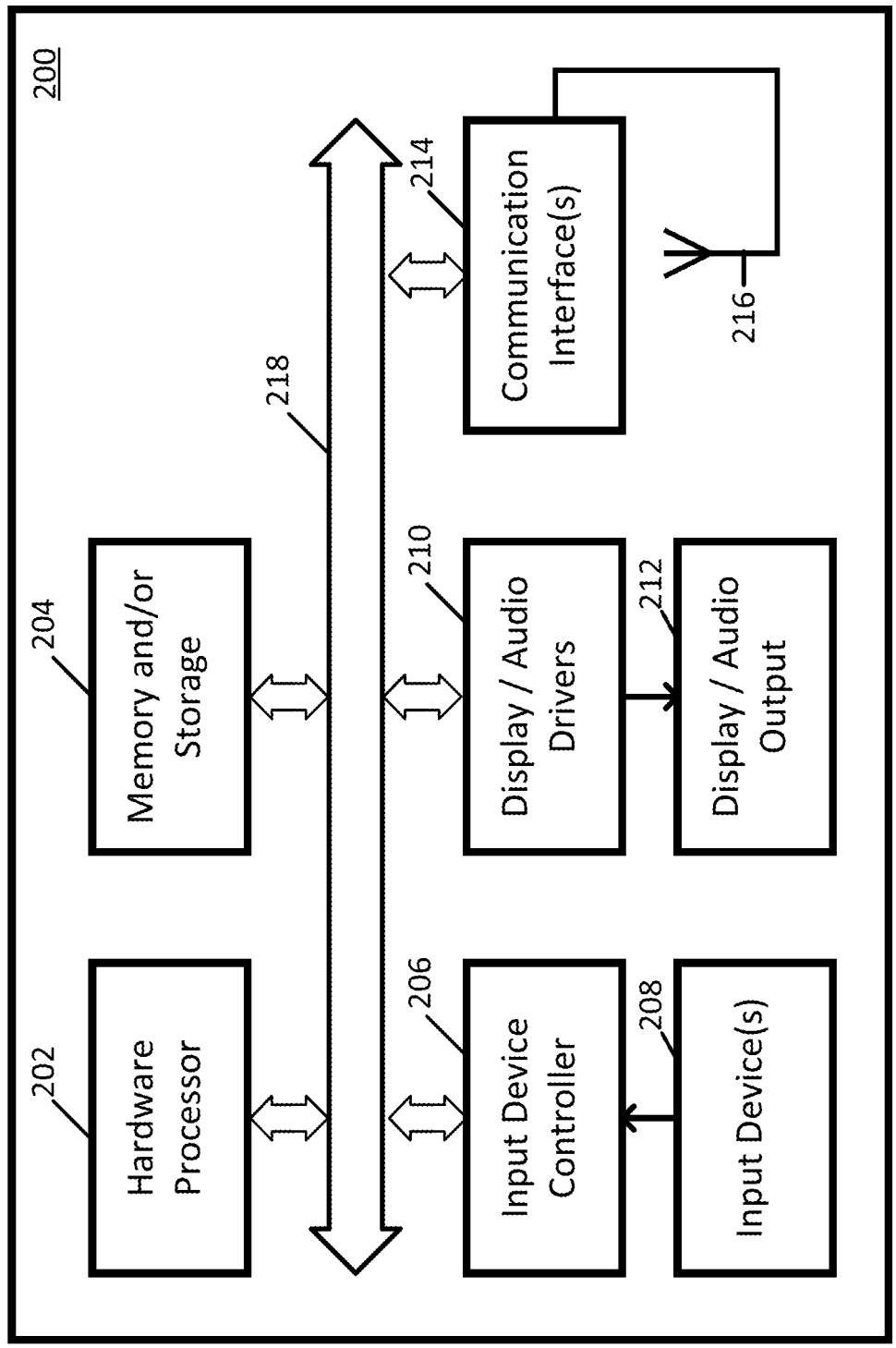
FIG. 2 shows an example of hardware that can be used in a server and/or a user device in accordance with some implementations of the disclosed subject matter.

Server 102 and user device 106 can be implemented using any suitable hardware in some implementations. For example, in some implementations, devices 102 and 106 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some implementations.

Memory and/or storage 204 can be any suitable memory and/or storage for storing programs, data, media content, and/or any other suitable information in some implementations. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some implementations. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some implementations. For example, display/audio drivers 210 can be circuitry for driving an LCD display, a speaker, an LED, or any other type of output device.

Communication interface(s) 214 can be any suitable circuitry for interfacing with one or more communication networks, such as network 104 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some implementations. In some implementations, antenna 216 can be omitted when not needed.

Bus 218 can be any suitable mechanism for communicating between two or more components 202, 204, 206, 210, and 214 in some implementations.

Any other suitable components can be included in hardware 200 in accordance with some implementations.

Figure 3:
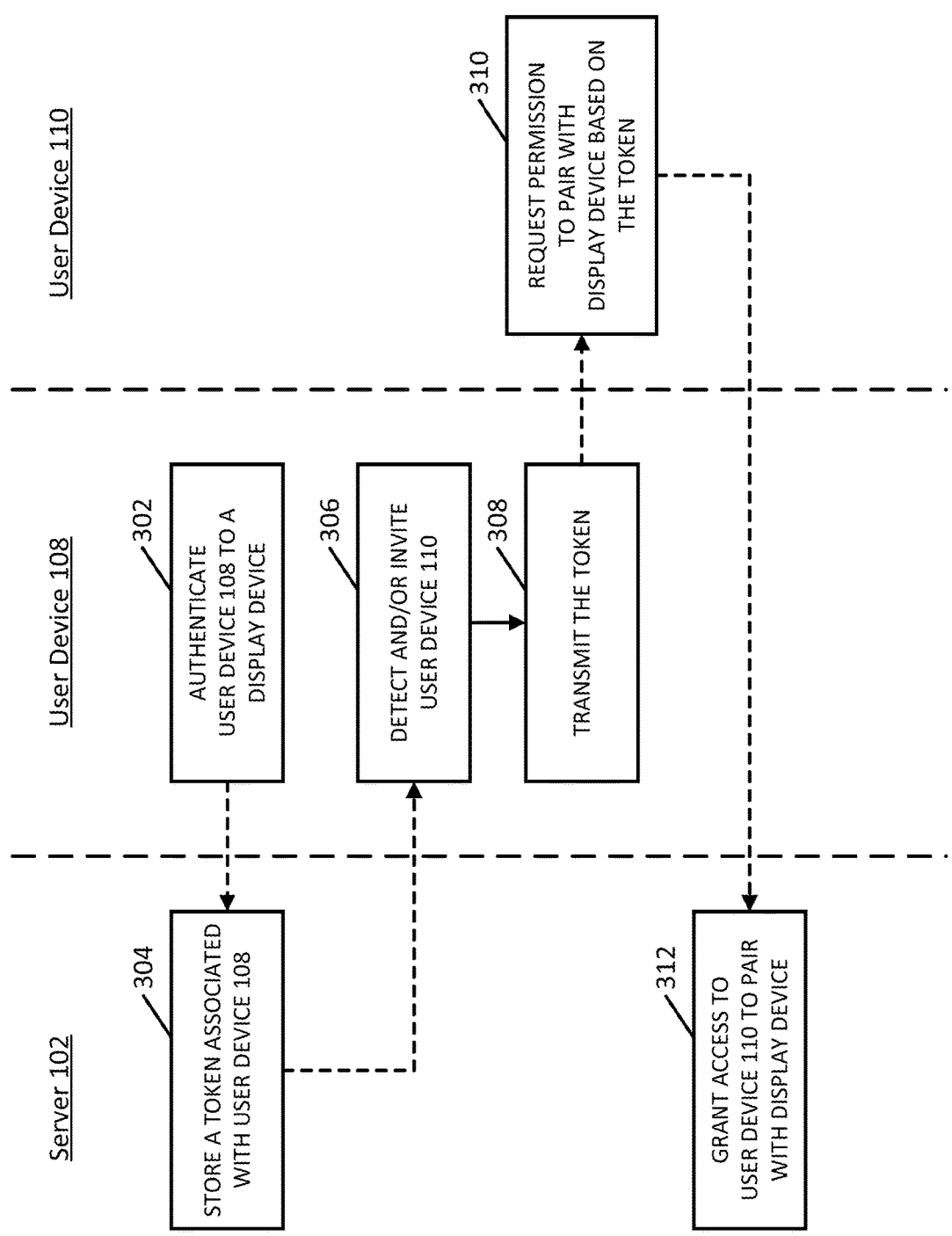
FIG. 3 shows an example of an information flow diagram for authenticating a user device to pair with a display device in accordance with some implementations of the disclosed subject matter.

Turning to FIG. 3, an information flow diagram 300 is shown in accordance with some implementations. As illustrated, in some implementations, information flow diagram 300 can be implemented on server 102, user device 108, and user device 110.

At 302, user device 108 can authenticate itself to a display device. User device 108 can be authenticated to communicate with the display device using any suitable technique or combination of techniques. For example, in some implementations, the display device can be associated with a password and/or numeric code, and user device 108 can be authenticated to communicate with the display device by a user of user device 108 entering the password and/or numeric code (e.g., in a particular browser window, within a particular application executing on user device 108, and/or in any other suitable manner). Note that, in some implementations, authentication of a user device to the display device can be based on a user account that is logged in on the user device. In some such implementations, any user device that has logged in to the user account can be authenticated to communicate with the display device. In some implementations, the user account can be associated with any suitable service, such as a video sharing service, a social networking service, a particular application executing on the user device, and/or any other suitable service.

At 304, server 102 can store a token associated with user device 108 and the display device. In some implementations, the token can be in any suitable format. For example, in some implementations, the token can be a randomly generated string of alphanumeric characters. In some implementations, the token can be generated by server 102 and/or user device 108. In instances where the token is generated by user device 108, the token can be transmitted to server 102, for example, in connection with block 302. Additionally or alternatively, in instances where the token is generated by server 102, the token can be transmitted to user device 108 to allow user device 108 to store information regarding the authentication to the display device, for example, in connection with block 304. In some implementations where the token is generated by server 102, user device 108 can request the token from server 102, and server 102 can generate the token in response to the request and transmit the token to user device 108. In some implementations, the token can indicate an identity of the display device. For example, in some implementations, the token can be generated to be a weak hash of an identifier of the display device, and/or any other suitable representation of the identity of the display device.

Server 102 can store the token in any suitable manner. For example, in some implementations, the token can be stored as a key in a key-value pair in association with an identifier of user device 108. As a more particular example, in some implementations, the token can be stored in association with information indicating the geographic location of user device 108 (e.g., based on Global Positioning Coordinates, and/or based on any other suitable information), an indication of an Internet Protocol (IP) address associated with user device 108, and/or any other suitable information. Note that, in some implementations, server 102 can use the stored token to maintain an ACL that indicates user devices allowed to communicate with the display device, where the stored token corresponds to and/or indicates the display device. For example, in some implementations, server 102 can add user devices to the ACL in response to receiving requests from user devices that include the stored token.

At 306, user device 108 can detect and invite user device 110 to be authenticated to communicate with the display device. For example, in some implementations, user device 108 can automatically detect user device 110, for example, based on a detection of user devices that are determined to be within a predetermined proximity of user device 108, as described in more detail in connection with FIG. 5. As another example, in some implementations, a user of user device 108 can select a contact (e.g., from a contacts list, and/or from any other source) corresponding to a user of user device 110. In some implementations, after detecting user device 110 and/or receiving an indication of user device 110 from a user of user device 108, user device 108 can transmit a notification and/or an invitation message to user device 110 to be paired with the display device. For example, in some implementations, the invitation message can indicate a name of and/or an identifier of the display device (e.g., "Living Room Television," and/or any other suitable name or identifier).

At 308, user device 108 can transmit the token to user device 110. In some implementations, the token can be transmitted in connection with the invitation message transmitted at block 306. Additionally or alternatively, in some implementations, the token can be transmitted in response to receiving, from user device 110, an indication that the invitation to be authenticated to the display device has been accepted by a user of user device 110. Note that, in some implementations, user device 108 can transmit information indicating an identity of user device 110 to server 102. In some such implementations, server 102 can then authenticate user device 110 to the display device. Note that, in instances where the token is generated by server 202, user device 108 can receive the token from server 202 (e.g., from a transmission from server 202 at block 304, and/or at any other suitable time), and can then transmit the token to user device 110.

At 310, user device 110 can request permission to be authenticated to communicate with the display device from server 102. For example, in some implementations, user device 110 can transmit a request to be authenticated to server 102 that includes the token. As a more particular example, in some implementations, user device 110 can transmit a Remote Procedure Call (RPC) to server 102 and can include the token as a parameter in the RPC.

At 312, server 102 can grant permission to user device 110 to communicate with the display device. For example, in some implementations, in response to receiving the token corresponding to the display device, server 102 can add user device 110 to the ACL corresponding to the display device. In some implementations, server 102 can transmit any suitable message to user device 110 indicating that permission has been granted. In some implementations, server 102 now receive requests from user device 110 to present content on the display device in response to receiving requests from user device 110. In some such implementations, user device 110 can request particular media content items to be presented on the display device through server 102, and no connection between user device 110 and the display device is required.

In some implementations, in response to receiving the token corresponding to the display device from user device 110 (which was received from user device 108), server 102 can grant rights and/or permissions to user device 110 that match the rights and/or permissions that user device 108 has in communicating with the display device. For example, server 102 can determine that user device 108 has permission to stream and/or cast media content items to the display device and, in response, grant permission to user device 110 to also stream and/or cast media content items to the display device. In another example, server 102 can determine that user device 108 has streaming rights to stream media content items to the display device but does not have administrator rights to modify settings of the display device and, in response, grant permission to user device 110 to also stream media content items while inhibiting user device 110 from receiving administrator rights to modify settings of the display device.

Note that, in some implementations, server 102 can include user device 110 in the ACL corresponding to the display device for any suitable duration of time. For example, in some implementations, server 102 can include user device 110 in the ACL until a specific instruction to remove user device 110 is received (e.g., from user device 108, and/or from any other suitable user device). As anther example, in some implementations, server 102 can include user device 110 in the ACL while a particular browser window and/or a particular application is open on user device 110. As yet another example, in some implementations, server 102 can include user device 110 in the ACL while user device 110 is within a particular proximity of user device 108 and/or the display device. As a more particular example, in some implementations, server 102 can remove user device 110 from the ACL in response to determining that user device 110 has been moved beyond a predetermined distance from the display device (e.g., more than ten feet, more than a hundred feet, more than a mile, and/or any other suitable distance). In some implementations, proximity can be based on any suitable information, such as GPS coordinates, connection to a particular network (e.g., a WIFI network within a home, a BLUETOOTH network, and/or any other suitable type of network that uses a wireless communication standard), ability of user device 110 to detect subaudible tones, and/or any other suitable information.

Additionally, note that, in some implementations, server 102 can maintain two ACLs. For example, in some implementations, a first ACL can indicate user devices that have been authenticated to the display device. As a more particular example, as shown in information flow diagram 300, the first ACL can include user device 108 and user device 110. As another example, in some implementations, a second ACL can indicate one or more user devices that have administrative permissions to transfer an authentication token to a detected and/or invited user device. As a more particular example, as shown in information flow diagram 300, the second ACL can include user device 108.

Figure 4:
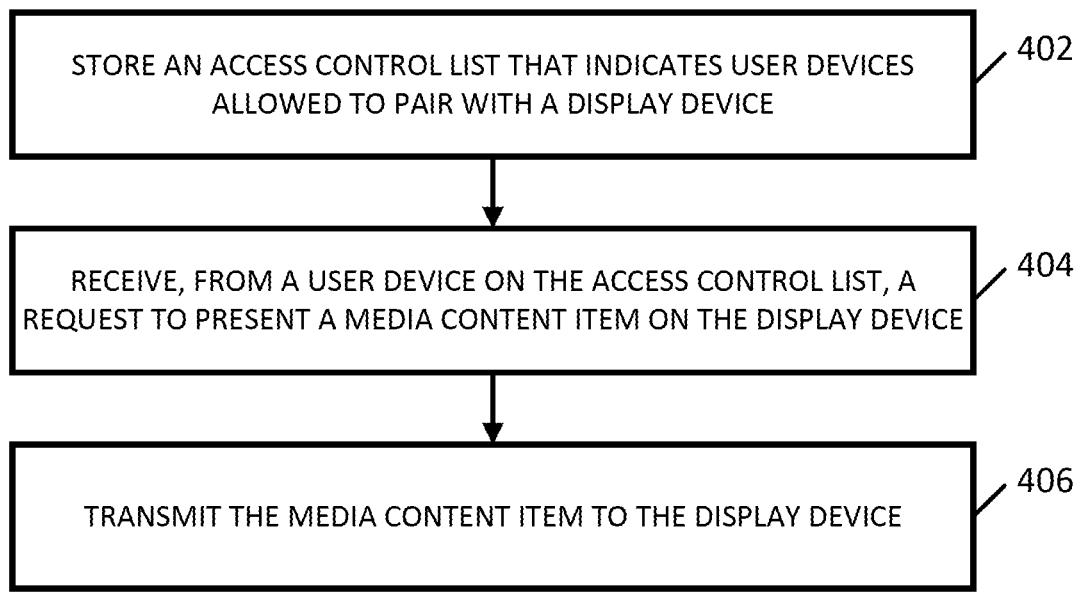
FIG. 4 shows an example of a process for storing indications of user devices allowed to pair with a display device in accordance with some implementations of the disclosed subject matter.

Turning to FIG. 4, an example 400 of a process for receiving a request from a user device and causing a corresponding media content item to be presented on the display device in response to receiving the request. In some implementations, blocks of process 400 can be implemented on a server, such as server 102.

Process 400 can begin by storing an ACL associated with the display device that indicates user devices that are authenticated to communicate with the display device and cause content to be presented on the display device at 402. For example, as described above in connection with FIG. 3, process 400 can store identifiers of user devices that are allowed to cause content to be presented on the display device in association with a token that corresponds to and/or indicates the display device. As a more particular example, as described above in connection with FIG. 3, process 400 can store an identifier of a user device in response to receiving a request to access the display device that includes the token corresponding to the display device. Note that, in some implementations, process 400 can update and/or modify the ACL at any suitable time(s) and in response to any suitable requests and/or information (e.g., information indicating a particular application has been closed, information indicating proximity of a particular user device to the display device, and/or any other suitable information).

At 404, process 400 can receive, from a user device, a request to present a media content item on the display device. In some implementations, the request can include any suitable information and can be received in any suitable manner. For example, in some implementations, the request can include an identifier corresponding to a media content item stored on server 102. As another example, in some implementations, the request can be received via a selection of a media content item from an application or browser window presented on the user device. In some implementations, process 400 can verify that the user device is included in the ACL stored at block 402. Note that, in some implementations, the requested content can be any suitable type of media content. For example, in some implementations, the requested media content can be a television program, a video, a piece of audio content, an image or picture, a slideshow, and/or any other suitable type of media content item. As another example, in some implementations, the requested media content can be a group of media content items, such as a playlist of media content items. As yet another example, in some implementations, the requested content can be a request to begin presenting a particular channel and/or stream of content, such as a particular broadcast channel of television content, a particular live stream of content (e.g., a radio program, a live video stream, and/or any other suitable type of content).

At 406, process 400 can transmit the requested media content item to the display device. For example, in some implementations, server 102 can transmit a stream of data corresponding to the media content item to the display device. In some implementations, process 400 can additionally transmit any suitable instructions for presenting the media content item, such as instructions for rendering a media player window on the display device within which the media content item is presented, and/or any other suitable instructions. As another example, in some implementations, process 400 can include instructions to navigate to a particular source of content, such as a particular channel and/or stream of content. As a more particular example, in some implementations, the instructions can include a Uniform Resource Locator (URL) specifying a location of the particular channel and/or stream of content.

Figure 5:
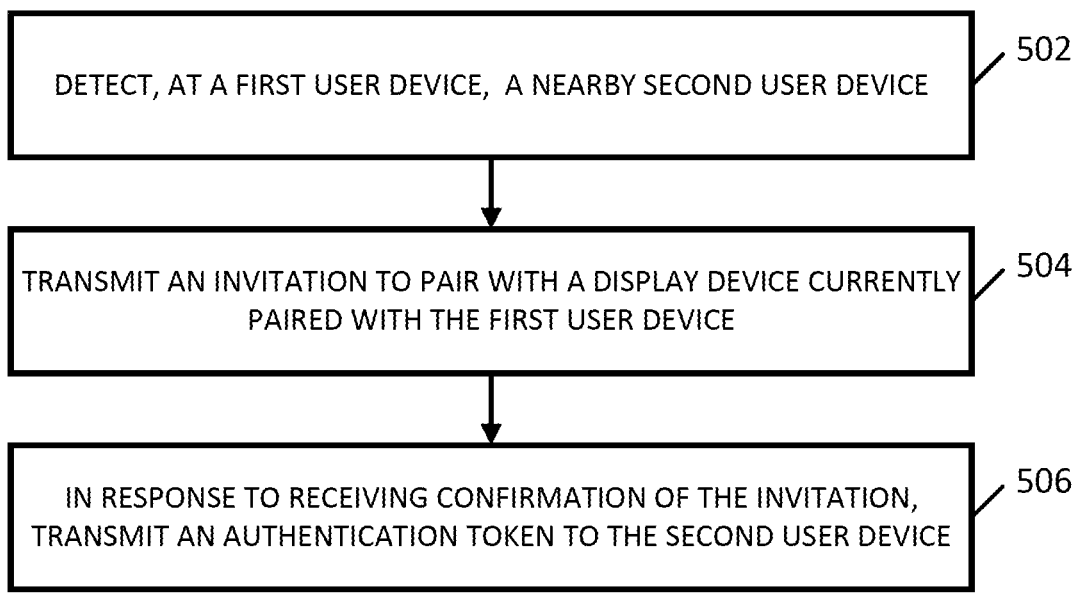
FIG. 5 shows an example of a process for detecting nearby user devices to pair with a display device in accordance with some implementations of the disclosed subject matter.

Turning to FIG. 5, and example 500 of a process for a first user device to detect a second user device and transmit an authentication token to the second user device is shown in accordance with some implementations. In some implementations, the first user device can be one that is already authenticated to communicate with a display device, as described above in connection with FIG. 3.

At 502, process 500 can detect, at a first user device, a second user device that is near the first user device. In some implementations, any suitable device discovery techniques can be used. For example, in some implementations, the first user device can detect other user devices that are connected to a particular network (e.g., a WIFI network in a home, a BLUETOOTH network, and/or any other suitable type of network that uses a wireless communication standard). As another example, in some implementations, the first user device can transmit a multicast message to all devices on a particular network requesting device details from the devices on the network. As yet another example, in some implementations, the first user device can transmit an audible and/or subaudible tone and can detect nearby user devices that respond to detection of the tone.

As still another example, in some implementations, nearby user devices can be discovered based on detection of predetermined gestures and/or movements. As a more particular example, the first user device and the second user device can each be programmed to notify a server (e.g., server 102) when a particular gesture and/or movement is detected (e.g., when the user device is bumped, when the user device is moved in a particular manner, when a particular gesture is detected on a touch screen of the user device, and/or any other suitable gesture and/or movement), and the notification can indicate a geographic location of the user device (e.g., using GPS coordinates, an indication of a WIFI network and/or BLUETOOTH network the device is connected to, and/or any other suitable information). In some such implementations, the server can determine that two user devices are near each other if two user devices notify the server within a predetermined time period (e.g., within one minute, within five minutes, and/or any other suitable predetermined time period) of detection of the particular gesture and/or movement and are located with a particular geographic proximity (e.g., within a particular distance, connected to the same network, and/or any other suitable proximity metric). In some implementations, in response to determining that the two user devices are near each other, the server can transmit a message to one or both user devices indicating that the two user devices are near each other.

In some implementations, process 500 can present indications of detected user devices in any suitable manner. For example, in some implementations, indications of detected devices can be presented in a list within a particular application (e.g., an application associated with presenting media content, an application associated with a social networking service, and/or any other suitable type of application). In some implementations, indications of detected devices can include any suitable information, such as a type of device (e.g., a tablet computer, a mobile phone, a wearable computer, and/or any other suitable type of device), a name associated with the device, a model of the device, and/or any other suitable type of information.

Note that, in some implementations, a user of the first user device can select the second user device by selecting a user of the second user device, such as from a list of contacts. In some such implementations, detection of the second user device can be omitted.

Process 500 can transmit an invitation message to be authenticated to the display device at 504. For example, in some implementations, the invitation message can indicate a name of the display device, a location of the display device, and/or any other suitable information. Note that, in some implementations, process 500 can transmit the invitation message in response to receiving a selection of a particular device from a list of detected devices. For example, in instances where process 500 presents indications of detected user devices in a list, process 500 can receive (e.g., from a user of a first user device), a selection of one or more of the detected user devices, and can transmit invitation messages to be authenticated to the display device to the selected user devices.

At 506, process 500 can transmit, to the second user device, a token corresponding with the display device. As described above in connection with FIG. 3, the token can be stored on a server that maintains an ACL indicating user devices that are allowed to communicate with the display device. Note that, in some implementations, the token can be one that was generated by the server in response to a request from the first user device and authentication of the first user device to the display device. Additionally or alternatively, in some implementations, the token can be one that was generated by the first user device during authentication of the first user device to the display device. In some implementations, the token can identify the display device and can allow the second user device to be authenticated to communicate with the display device when received by the server in a request from the second user device.

It should be understood that at least some of the above described blocks of the processes of FIGS. 3-5 can be executed or performed in any order or sequence not limited to the order and sequence shown in and described in the figures. Also, some of the above blocks of the processes of FIGS. 3-5 can be executed or performed substantially simultaneously where appropriate or in parallel to reduce latency and processing times. Additionally or alternatively, some of the above described blocks of the processes of FIGS. 3-5 can be omitted.

In some implementations, any suitable computer readable media can be used for storing instructions for performing the functions and/or processes herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for authentication of user devices to a display device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for authentication of user devices, the method comprising:
    performing an authentication of a first user device to a media device, wherein:
        an authentication token that indicates an identity of the media device is associated with the authentication of the first user device to the media device, and
        an identifier of the first user device is included in an access control list maintained by a server system, wherein the access control list indicates devices that are authenticated and provided with media playback control on the media device;
    identifying, using the first user device, a second user device in proximity to the first user device;
    transmitting, using the first user device to the second user device, an invitation message to authenticate the second user device to the media device, wherein:
        interaction with the invitation message causes the authentication token to be transferred from the first user device to the second user device,
        the authentication token is transmitted by the second user device to the server system to authenticate the second user device to the media device,
        the second user device is added to the access control list maintained by the server system, and
        after the second user device has been authenticated by being added to the access control list, a media content item selected using the second user device is transmitted to the media device for playback; and
    removing, by the server system, the second user device from the access control list maintained by the server system based on proximity of the second user device to the media device, wherein removing the second user device from the access control list prevents the second user device from selecting media content items for playback by the media device.

2. The method of claim 1, wherein the authentication token is stored on the server system in association with the identifier of the first user device.

3. The method of claim 2, wherein the authentication token is used as a key in a key-value pair in connection with a corresponding access control list stored on the server system.

4. The method of claim 1, further comprising:
    generating, using the first user device, the authentication token; and
    transmitting the authentication token to a server.

5. The method of claim 1, further comprising:
    transmitting, to a server, a request for the authentication token; and
    receiving the authentication token from the server.

6. The method of claim 1, further comprising receiving, from a contact list associated with a first user of the first user device, an indication of a second user of the second user device, wherein the second user device is identified based on the received indication.

7. The method of claim 1, wherein identifying the second user device comprises detecting the second user device based on a connection to a communications network.

8. The method of claim 1, wherein identifying the second user device comprises:
    detecting a movement of the first user device; and
    transmitting, to a server, an indication of the movement and a first location associated with the first user device.

9. The method of claim 8, further comprising receiving, from the server, an identifier associated with the second user device, wherein the second user device detected a movement of the second user device at a second location and wherein the first location and the second location are within a predetermined distance.

10. The method of claim 1, further comprising:
    receiving, from a user of the first user device, an indication that the second user device is not to be authenticated to the media device; and
    transmitting, to a server, a request to remove authentication permission for the second user device to the media device.

11. A system for authentication of user devices, the system comprising:
    a hardware processor on a first user device that:
        performs an authentication of the first user device to a media device, wherein:
            an authentication token that indicates an identity of the media device is associated with the authentication of the first user device to the media device, and
            an identifier of the first user device is included in an access control list, wherein the access control list indicates devices that are authenticated and provided with media playback control on the media device upon authentication;
        identifies, using the first user device, a second user device in proximity to the first user device; and
        transmits, using the first user device to the second user device, an invitation message to authenticate the second user device to the media device, wherein:
            interaction with the invitation message causes the authentication token to be transferred from the first user device to the second user device, the authentication token is used to authenticate the second user device to the media device, the second user device is added to the access control list maintained by a server system, after the second user device has been authenticated by being added to the access control list, a media content item selected using the second user device is transmitted to the media device for playback, and the server system removes the second user device from the access control list based on proximity of the second user device to the media device, wherein removing the second user device from the access control list prevents the second user device from selecting media content items for playback by the media device.

12. The system of claim 11, wherein the authentication token is stored on the server system in association with the identifier of the first user device.

13. The system of claim 12, wherein the authentication token is used as a key in a key-value pair in connection with a corresponding access control list stored on the server system.

14. The system of claim 11, wherein the hardware processor also:

generates, using the first user device, the authentication token; and transmits the authentication token to a server.

15. The system of claim 11, wherein the hardware processor also:

transmits, to a server, a request for the authentication token; and receives the authentication token from the server.

16. The system of claim 11, wherein the hardware processor also receives, from a contact list associated with a first user of the first user device, an indication of a second user of the second user device, wherein the second user device is identified based on the received indication.

17. The system of claim 11, wherein identifying the second user device comprises detecting the second user device based on a connection to a communications network.

18. The system of claim 11, wherein identifying the second user device comprises:

detecting a movement of the first user device; and transmitting, to a server, an indication of the movement and a first location associated with the first user device.

19. The system of claim 18, wherein the hardware processor also receives, from the server, an identifier associated with the second user device, wherein the second user device detected a movement of the second user device at a second location and wherein the first location and the second location are within a predetermined distance.

20. The system of claim 11, wherein the hardware processor also:

receives, from a user of the first user device, an indication that the second user device is not to be authenticated to the media device; and transmits, to a server, a request to remove authentication permission for the second user device to the media device.

21. A non-transitory computer-readable medium containing computer-executable instructions that, when executed by a processor, cause the processor to perform a method for authentication of user devices, the method comprising:

performing an authentication of a first user device to a media device, wherein:

an authentication token that indicates an identity of the media device is associated with the authentication of the first user device to the media device, and an identifier of the first user device is included in an access control list maintained by a server system, wherein the access control list indicates devices that are authenticated and provided with media playback control on the media device;

identifying, using the first user device, a second user device in proximity to the first user device; and transmitting, using the first user device to the second user device, an invitation message to authenticate the second user device to the media device, wherein:

interaction with the invitation message causes the authentication token to be transferred from the first user device to the second user device, the authentication token is transmitted by the second user device to the server system to authenticate the second user device to the media device, the second user device is added to the access control list maintained by the server system, and after the second user device has been authenticated by being added to the access control list, a media content item selected using the second user device is transmitted to the media device for playback, and the server system removes the second user device from the access control list based on proximity of the second user device to the media device, wherein removing the second user device from the access control list prevents the second user device from selecting media content items for playback by the media device.

* * * * *